(12) United States Patent
Tenghamn (10) Patent No.: US 10,451,759 B2
(45) Date of Patent: Oct. 22, 2019

(54) CONTROL SYSTEM FOR A MARINE VIBRATOR

(71) Applicant: PGS Geophysical AS, Oslo (NO)

(72) Inventor: Stig Rune Lennart Tenghamn, Houston, TX (US)

(73) Assignee: PGS Geophysical AS, Oslo (NO)

( * ) Notice: Subject to any disclaimer, the term of this patent is extended or adjusted under 35 U.S.C. 154(b) by 250 days.

(21) Appl. No.: 15/424,240

(22) Filed: Feb. 3, 2017

(65) Prior Publication Data

US 2017/0299750 A1 Oct. 19, 2017

Related U.S. Application Data

(60) Provisional application No. 62/322,884, filed on Apr. 15, 2016.

(51) Int. Cl.
*G01V 1/38* (2006.01)
*G01V 1/00* (2006.01)

(52) U.S. Cl.
CPC ............ *G01V 1/3861* (2013.01); *G01V 1/005* (2013.01); *G01V 1/38* (2013.01); *G01V 1/3808* (2013.01); *G01V 2210/1214* (2013.01)

(58) Field of Classification Search
CPC ...... G01V 1/3861; G01V 1/3808; G01V 1/38; G01V 1/005; G01V 2210/1214
See application file for complete search history.

(56) References Cited

U.S. PATENT DOCUMENTS

| 7,376,045 | B2 | 5/2008 | Falkenberg et al. |
| 7,974,152 | B2 | 7/2011 | Tenghamn |
| 2003/0221901 | A1 | 12/2003 | Tenghamn et al. |
| 2010/0322028 | A1 | 12/2010 | Tenghamn et al. |
| 2014/0226439 | A1 | 8/2014 | Tenghamn et al. |
| 2015/0085606 | A1 | 3/2015 | Tenghamn et al. |
| 2015/0204992 | A1 | 7/2015 | Dellinger et al. |
| 2016/0334541 | A1 | 11/2016 | Tenghamn et al. |
| 2017/0299750 | A1* | 10/2017 | Tenghamn ............ G01V 1/3808 |

FOREIGN PATENT DOCUMENTS

| AU | 201420243 | | 11/2014 | |
| AU | 2017202087 A1 | * | 11/2017 | ............ G01V 1/3808 |
| BR | 102017007562 A2 | * | 10/2017 | ............ G01V 1/3808 |
| EP | 2267486 | | 12/2010 | |
| EP | 3232231 A1 | * | 10/2017 | ............ G01V 1/3808 |
| WO | 2015101643 | | 7/2015 | |

OTHER PUBLICATIONS

Olof Sornmo et al., "Frequency-Domain Iterative Learning Control of a Marine Vibrator," Control Engineering Practice, Feb. 2016, pp. 70-80, vol. 47.
European Search Report for Application No. 17166773.6-1559 dated Aug. 22, 2017.
European Search Report for Application No. 17164563.3-1559 dated Feb. 8, 2017.

* cited by examiner

*Primary Examiner* — Daniel Pihulic (57) ABSTRACT

Disclosed are control systems for marine vibrators. An example method may comprise recording a signal at a seismic sensor; running an iterative learning control characterization for a marine vibrator on the signal from the seismic sensor; measuring movement of an outer shell of the marine vibrator using a motion sensor to obtain a motion sensor signal; and controlling the marine vibrator using the motion sensor signal as a reference signal.

20 Claims, 8 Drawing Sheets

CONTROL SYSTEM FOR A MARINE VIBRATOR

CROSS-REFERENCE TO RELATED APPLICATIONS

The present application claims the benefit of U.S. Provisional Application No. 62/322,884, filed Apr. 15, 2016, entitled "Control System for a Marine Vibrator," the entire disclosure of which is incorporated herein by reference.

BACKGROUND

Techniques for marine surveying include marine seismic surveying, in which geophysical data may be collected from below the Earth's surface. Seismic surveying has applications in mineral and energy exploration and production to help identify locations of hydrocarbon-bearing formations. Seismic surveying typically may include towing a seismic source in a body of water. One more "streamers" may also be towed through the water by the same or a different vessel. The streamers are typically cables that include a plurality of sensors disposed thereon at spaced apart locations along the length of each cable. Some seismic surveys locate sensors on ocean bottom cables or nodes in addition to, or instead of, streamers. The sensors may be configured to generate a signal that is related to a parameter being measured by the sensor. At selected times, the seismic source may be actuated to generate, for example, seismic energy that travels downwardly through the water and into the subsurface foimations. Seismic energy that interacts with interfaces, generally at the boundaries between layers of the subsurface formations, may be returned toward the surface and detected by the sensors on the streamers. The detected energy may be used to infer certain properties of the subsurface formations, such as structure, mineral composition and fluid content, thereby providing information useful in the recovery of hydrocarbons.

Most of the seismic sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of seismic source that can be used in seismic surveying includes marine vibrators, including hydraulically powered sources, electro-mechanical vibrators, electrical marine vibrators, and sources employing piezoelectric or magnetostrictive material.

Marine vibrators typically generate vibrations through a range of frequencies in a pattern known as a "sweep" or "chirp." For example, a sweep can be generated from 10-100 Hertz ("Hz"). The signal may then be correlated at the sensor to generate a pulse which should give the same result as using an impulsive-type source. Advantageously, the energy may be spread out with the sweep to provide a lessened environmental impact. If the marine vibrator is controllable and can handle arbitrary signals, signals may be created that use a direct spread spectrum that may have several advantages, such as low peak energy at any frequency at any time, decoding of the signal only by the user, and noise characteristics that may be difficult to distinguish from natural background noise, which may be advantageous in environmentally sensitive areas. In addition, a direct spread spectrum may allow the same bandwidth to be used with several marine vibrators at the same time. To increase signal level, the marine vibrators may be placed in an array. To be able to use arbitrary signals in a marine vibrator array, a feedback system may be used to produce repeatable signals and to reduce harmonics in the sweep. Feedback systems have been used, but can have drawbacks. For example, certain feedback systems may not be able to effectively reduce harmonics. If the sweep contains harmonics, it can add correlation noise when interfering with the fundamental tone during correlation for reservoir monitoring. Additionally, when sweeping at the same time with two or more marine vibrators at two or more different frequency ranges, the harmonics from the low frequency of one vibrator may interfere with the fundamentals of the other vibrator.

BRIEF DESCRIPTION OF THE DRAWINGS

These drawings illustrate certain aspects of some of the embodiments of the present disclosure and should not be used to limit or define the disclosure.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

Embodiments may be directed to marine vibrators and associated methods. In at least one embodiment, a marine vibrator system may include a marine vibrator, a power amplifier, a sensor system, and a control system, which may include a signal generator. The sensor system may include a seismic sensor and a motion sensor. The control system may implement an iterative learning control characterization to provide updated signals to drive the marine vibrator. The sensor system may provide feedback to the control system for use in an iterative learning control engine. By first using the seismic sensor as feedback to the iterative learning control engine and then switching to the motion sensor as the feedback, the marine vibrator may be operated with fewer harmonics, for example, as the motion sensor may be less impacted by disturbances in the water or a nearby source.

Accordingly, disclosed herein are methods and systems for control of marine vibrators. An example method may comprise recording a signal at a seismic sensor; running an iterative learning control characterization for a marine vibrator on the signal from the seismic sensor; measuring movement of an outer shell of the marine vibrator using a motion sensor to obtain a motion sensor signal; and controlling the marine vibrator using the motion sensor signal as a reference signal.

Another example method may comprise towing a sensor streamer in a body of water, wherein the sensor streamer comprises a plurality of seismic sensors that are spaced apart; operating a marine vibrator in the body of water to generate seismic energy that travels downwardly into one or more formations below a water bottom; running an iterative learning control characterization for the marine vibrator on a signal from one of the seismic sensors; measuring movement of an outer shell of the marine vibrator using a motion sensor to obtain a motion sensor signal; controlling the marine vibrator using the motion sensor signal as a reference signal; detecting the seismic energy with the seismic sensors after the seismic energy has interacted with the formations; and recording the detected seismic energy on one or more tangible, non-volatile computer-readable media thereby creating a geophysical data product.

An example system may comprise a marine vibrator comprising an outer shell; a power amplifier configured to transfer electrical signals to the marine vibrator; a sensor system comprising a seismic sensor and a motion sensor, wherein the motion sensor is directly coupled to the outer shell; an iterative learning control engine configured to run an iterative learning control characterization based on the seismic sensor as feedback and then run the iterative learning control characterization based on the motion sensor as the feedback, wherein the iterative learning control engine calculates a new control signal from the marine vibrator; and a control system configured to run the iterative learning control engine and provide the new control signal to the marine vibrator.

Figure 1:
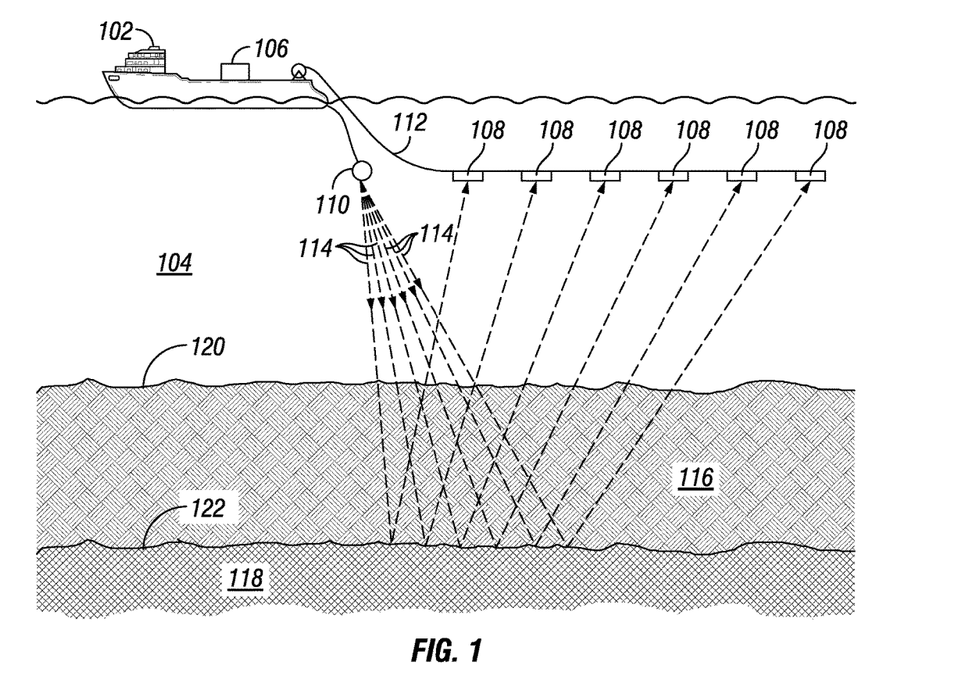
FIG. 1 illustrates an example embodiment of a marine seismic survey system using a marine vibrator.

FIG. 1 illustrates a marine seismic survey system 100 in accordance with example embodiments. Marine seismic survey system 100 may include a survey vessel 102 that moves along the surface of a body of water 104, such as a lake or ocean. The survey vessel 102 may include thereon equipment, shown generally at 106 and collectively referred to herein as a "recording system." The recording system 106 may include devices (none shown separately) for detecting and making a time indexed record of signals generated by each of seismic sensors 108 (explained further below) and for actuating a marine vibrator 110 at selected times. The recording system 106 may also include devices (none shown separately) for determining the geodetic position of the survey vessel 102 and the various seismic sensors 108.

As illustrated, the survey vessel 102 or a different vessel may tow marine vibrator 110. Although only a single marine vibrator 110 is shown, it should be understood that more than one marine vibrator 110 may be used, which may be towed by the survey vessel 102 or different survey vessels, for example, as desired for a particular application. In contrast to impulsive-type sources which transmit energy during a very limited amount of time, the marine vibrator 110 may have a reduced environmental impact due the distribution of energy over time. In particular, the marine vibrator 110 may have a reduced peak amplitude of the transmitted seismic signal during a marine seismic survey with little or no reduction in the data quality. For example, by using a marine vibrator 110 with, for example, a five-second sweep, instead of an impulsive-type source such as an air gun, the peak amplitudes can be reduced by as much as 30 dB or even more. If pseudo-noise source sequences are used to not only spread out the energy over time but also the frequency over time, the peak amplitudes may be reduced by another 20 dB or even more. In some embodiments, the peak amplitudes may be in the range of about 10 dB to about 40 dB.

With continued reference to FIG. 1, the survey vessel 102 may further tow sensor streamer 112. The sensor streamer 112 may be towed in a selected pattern in the body of water 104 by the survey vessel 102 or a different vessel. While not shown, the survey vessel 102 may tow a plurality of sensor streamers 112, which may be laterally spaced apart behind the survey vessel 102. "Lateral" or "laterally," in the present context, means transverse to the direction of the motion of the survey vessel 102. The sensor streamers 112 may each be formed, for example, by coupling a plurality of streamer segments (none shown separately). The sensor streamers 112 may have a length, for example, in a range of from about 2,000 meters to about 12,000 meters or longer. However, it should be understood that the sensor streamers 112 may have lengths shorter or longer than the range specifically disclosed herein. The configurations of the sensor streamer 112 on FIG. 1 is provided to illustrate an example embodiment and is not intended to limit the present disclosure. It should be noted that, while the present example, shows only a single sensor streamer 112, the present disclosure is applicable to any number of sensor streamers 112 towed by survey vessel 102 or any other vessel. The sensor streamer 112 may include seismic sensors 108 thereon at spaced apart locations. The seismic sensors 108 may be any type of seismic sensors known in the art, including, but not limited to, hydrophones, geophones, particle velocity sensors, particle displacement sensors, particle acceleration sensors, or pressure gradient sensors, for example. While not illustrated, the seismic sensors 108 may alternatively be disposed on ocean bottom cables or subsurface acquisition nodes in addition to, or in place of, sensor streamer 112.

During operation, certain equipment (not shown separately) in the recording system 106 may cause the marine vibrator 110 to actuate at selected times. When actuated, the marine vibrator 110 may produce seismic energy 114 that generates generally outwardly from the marine vibrator 110. As illustrated, the seismic energy 114 may travel downwardly through the body of water 104 and may pass, at least in part, through formations 116, 118 below water bottom 120. Without limitation, the formations 116, 118 may function as a low pass filter, with the seismic energy 114 penetrating as deep as 3 kilometers. Seismic energy 114 may be at least partially reflected, for example, at acoustic impedance boundaries 122, below the water bottom 120, and then travel upwardly where it may be detected at seismic sensors 108. The seismic sensors 108 may generate response signals, such as electrical or optical signals, in response to detecting the seismic energy 114 emitted from the marine vibrator 110 after interaction with the formations 116, 118. Signals generated by the seismic sensors 108 may be communicated to the recording system 106. Structure of the formations 116, 118, among other properties, may be inferred, for example, by analysis of the detected energy, such as its amplitude, phase, and travel time.

In accordance with example embodiments, a geophysical data product may be produced from the detected seismic energy. The geophysical data product may be used to evaluate certain properties of formations 116, 118. The geophysical data product may include acquired and/or processed seismic data and may be stored on a non-transitory, tangible computer-readable medium. The geophysical data product may be produced offshore (i.e., by equipment on a vessel) or onshore (i.e., at a facility on land) either within the United States and/or in another country. Specifically, embodiments may include producing a geophysical data product from at least the measured seismic energy and storing the geophysical data product on a tangible, non-volatile computer-readable medium suitable for importing onshore. If the geophysical data product is produced offshore and/or in another country, it may be imported onshore to a facility in, for example, the United States or another country. Once onshore in, for example, the United States (or another country), further processing and/or geophysical analysis may be performed on the geophysical data product.

Figure 2:
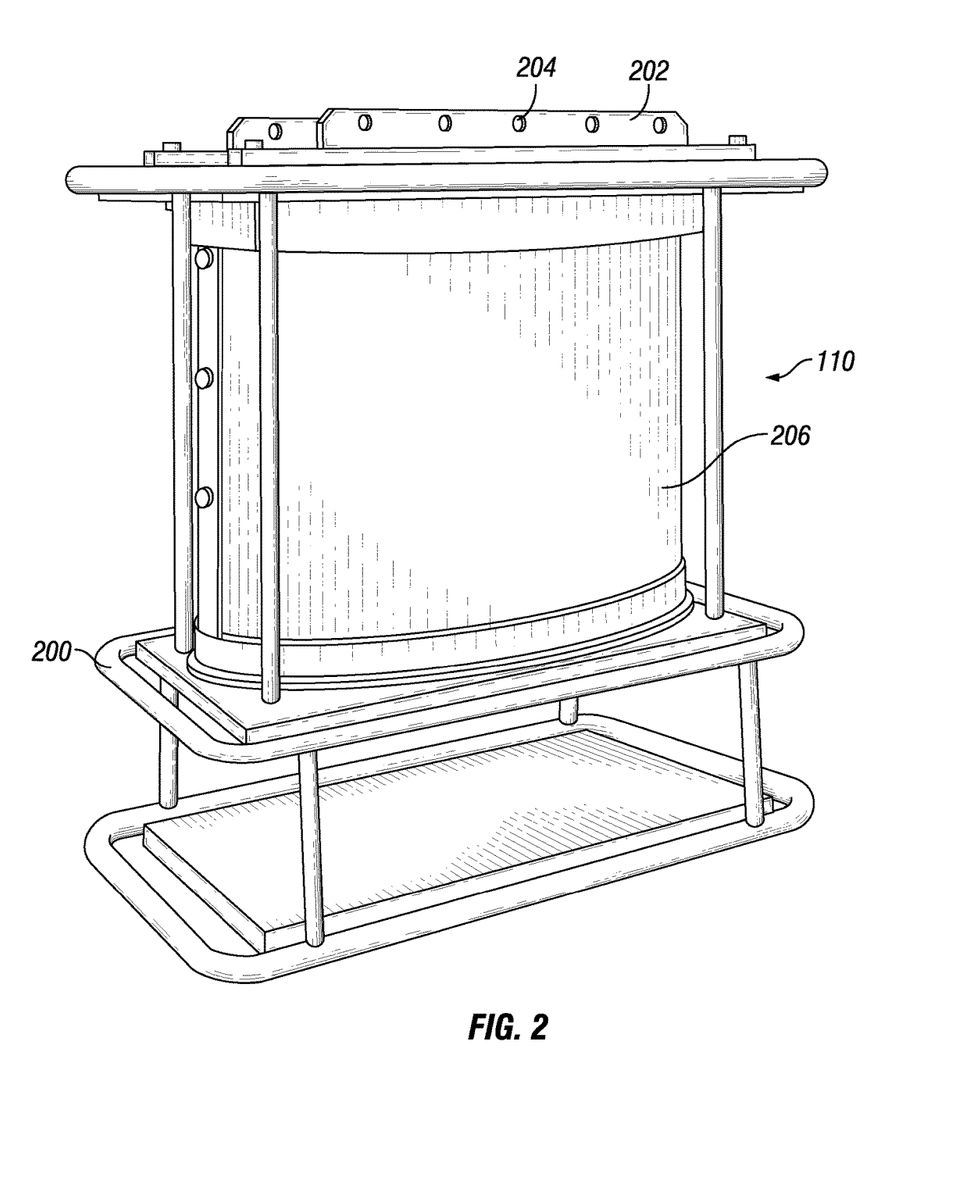
FIG. 2 illustrates an example embodiment of a marine vibrator.

FIG. 2 illustrates an example embodiment of a marine vibrator 110. In the illustrated embodiment, the marine vibrator 110 is a flextensional shell-type source. As illustrated, the marine vibrator 110 is mounted within a frame 200. A bracket 202 may be mounted to the top of the frame 200. The bracket 202 may include a plurality of apertures 204 used for deploying the marine vibrator 110 in body of water 104 (FIG. 1).

As illustrated, the marine vibrator 110 may include an outer shell 206. In one or more embodiments, the outer shell 206 may be a flextensional shell. The term "flextensional" refers to the driver (not shown) operating to cause flexural vibration of the outer shell 206. Although the outer shell 206 is depicted on FIG. 2 as being essentially elliptic in cross section, flextensional shells of other shapes, including convex, concave, flat, or combinations thereof, may also be used in accordance with embodiments of the present invention. The outer shell 206 may include, but it not limited to, spring steel, beryllium copper alloy, glass fiber reinforced plastic, carbon fiber reinforced or other suitable flexible spring material. Suitable flexible spring materials may have a high yield strength and not peimanently defoim when acted on by the driver (not shown). In some embodiments, the outer shell 206 may be a class V flextensional transducer. However, those of ordinary skill in the art, with the benefit of this disclosure, should be able to select other types of flextensional transducers that may be suitable for use in present embodiments. While not illustrated, the outer shell 206 may be formed, for example, by two shell side-portions (e.g., shell side-portion 400 on FIG. 4) that may be mirror images of one another. In some embodiments, the dimensions, material make-up, and shape of the outer shell 206 may be selected to provide a soft spring constant for vibrations of between about 1 Hz to about 300 Hz, alternatively, between about 5 Hz and about 100 Hz, when the marine vibrator 110 is submerged in water, for example, at a depth of from about 1 meter to about 375 meters and, more particularly, from about 1 meter to about 100 meters. In some embodiments, two or more marine vibrators 110 may be used to cover this frequency range, for example, with one of the marine vibrators 110 (or an array thereof) operating from 5 Hz to 20 Hz and another of the marine vibrators (or array thereof) operating from 20 Hz to 100 Hz, however embodiments are not so limited. The size of marine vibrator 110 may be smaller than the wavelengths that it generates, such that the marine vibrator 110 may be considered omnidirectional. In some embodiments, the acceleration at the center of outer shell 206 may be proportional to the sound pressure.

The marine vibrator 110 may be a hydraulically powered vibrator, an electro-mechanical vibrator, or an electrical marine vibrator, or alternatively the marine vibrator 110 may employ an electrostrictive (e.g., piezoelectric) or magnetostrictive material. In particular embodiments, the marine vibrator 110 may further include a linear drive (not shown), which may be an electro-dynamic actuator. In some embodiments, the linear drive may be a "moving coil" or "voice coil" actuator. A linear drive that employs a single, bi-directional linear actuator, one or more uni-directional actuators, a plurality of actuators arranged in parallel, or other suitable arrangement are contemplated within the scope of the present invention. The linear drive (or other suitable driver) may be operated to cause vibration and flexing of the outer shell 206 to generate seismic energy 114 (FIG. 1).

Figure 3:
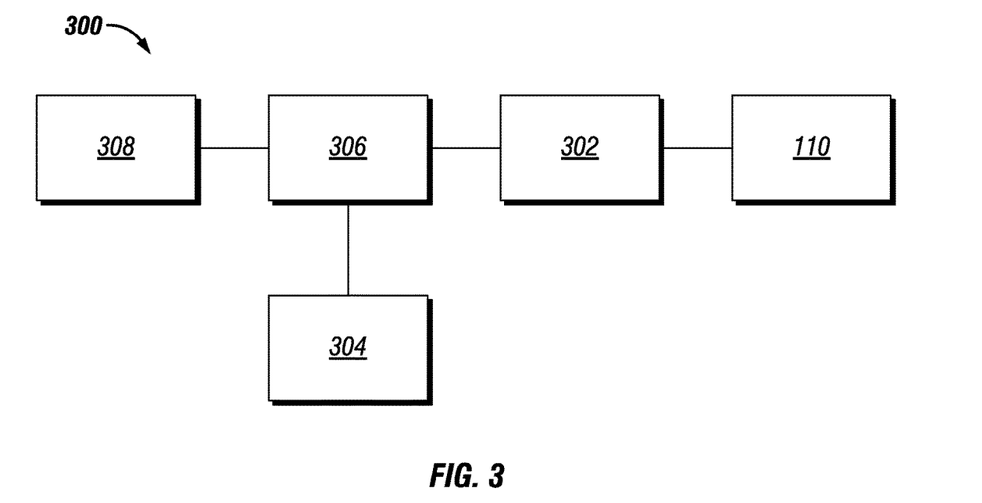
FIG. 3 illustrates an example embodiment of a marine vibrator system.

FIG. 3 illustrates an example embodiment of a marine vibrator system 300. As illustrated, the marine vibrator system 300 may include a marine vibrator 110, a power amplifier 302, a sensor system 304, and a control system 306, which may include a signal generator (e.g., signal generator 502 shown on FIG. 5). The marine vibrator 110 may be configured to obtain a desired efficiency, for example, by having two mechanical resonances. By way of example, the marine vibrator 110 may display two resonance frequencies (when submerged in the body of water 104 on FIG. 1, for example) in a frequency range of interest (e.g., between about 1 Hz to about 100 Hz). The control system 306 by way of the signal generator (not shown separately) may provide an initial signal to the marine vibrator 110. The initial signal from the control system 306 in the form of an electrical signal may be provided to the power amplifier 302, which is coupled to the marine vibrator 110. The power amplifier 302 may be configured to transfer electrical impulses to the marine vibrator 110. For example, the power amplifier 302 receives this input signal from the control system 306 and transmits an amplified or modified electrical impulse to the driver (not shown) which may generate a mechanical force, for example, through the moving coils or magnetic circuits in the marine vibrator 110. This mechanical force may be transferred to the outer shell 206 (e.g., shown on FIG. 2) causing vibration and flexing to generate seismic energy 114 (e.g., shown on FIG. 1).

Sensor system 304 may include one or more sensors to record signals from the marine vibrator 110. One or more of the sensors in the sensor system 304 may be placed on or coupled to the marine vibrator 110, which may be referred to as near field sensors. The near field sensors may include a sensor (e.g., motion sensor 402 shown on FIG. 4) coupled to the outer shell 206 (e.g., shown on FIG. 2). Examples of near field sensors may include motion sensors, such as accelerometers, geophones, or any other type of motion sensor known in the art. One or more of the sensors in sensor system 304 may be remote from the marine vibrator 110, which may be referred to as far field sensors. The term "far field sensors" generally refer to sensors that are not physically mounted to the marine vibrator 110 where the pressure and particle velocity may be in phase. The far field sensor may measure, for example, either pressure or particle velocity. The far field sensor may be located about 1 to about 2 meters or more from the marine vibrator 110. Examples of suitable far field sensors may include hydrophones, geophones, particle velocity sensors, particle displacement sensors, particle acceleration sensors, or pressure gradient sensors, for example, such that the signal from the marine vibrator 110 may be recorded at such sensors (e.g., the hydrophone). In some embodiments, the far field sensors may include a seismic sensor (e.g., one or more of the seismic sensors 108 shown on FIG. 1) that records a signal.

Figure 4:
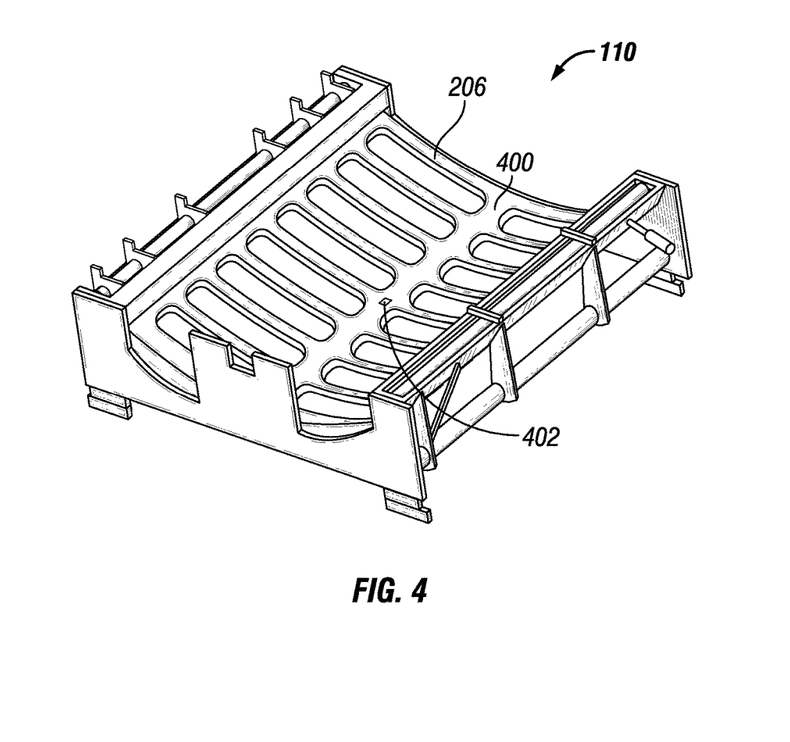
FIG. 4 illustrates an example embodiment of a marine vibrator having a motion sensor.

Referring now to FIG. 4, a cutaway view of an example of marine vibrator 110 is shown. The inside of outer shell 206 can be seen in the illustrated embodiment. A shell side-portion 400 is shown on FIG. 4. As described above, an opposing shell side-portion (not shown), which may be a mirror image of shell side-portion 400, may be provided to form outer shell 206. The shell-side portions (e.g., shell-side portion 400) may be disposed on either side of a midline of outer shell 206. The driver (not shown) may operate to cause flexing and vibration of each of the shell-side portions, such as shell side-portion 400. As illustrated a near field sensor, illustrated as motion sensor 402, may be disposed on outer shell 206. In the illustrated embodiment, the motion sensor 402 may be disposed on the inner surface of the shell side-portion 400. Motion sensor 402 may be disposed in the middle of shell side-portion 400 as acceleration at the middle may be proportional to sound pressure, but should not be limited to this placement. Rather, motion sensor 402 may be disposed in other positions on the shell side-portion 400 so that motion of the outer shell 206 may be measured. While not shown, other sensors may be positioned on the marine vibrator 110. For example, sensors, such as hydrophones or additional motion sensors, may be disposed on the outer shell 206 or the surrounding structure of marine vibrator 110 to measure the response of marine vibrator 110 at other selected positions.

With reference again to FIG. 3, the recorded signals from sensor system 304 may be used as feedback to the control system 306. The control system 306 may be part of the recording system 106 (e.g., shown on FIG. 1) or a different computer. The control system 306 may include hardware and software that operate to control marine vibrator 110. For example, control system 306 may include a processor (e.g., microprocessor), memory, and interfaces, among other components. Processor may include any type of computational circuit, such as a microprocessor, a complex instruction set computing (CISC) microprocessor, a reduced instruction set computing (RISC) microprocessor, a very long instruction word (VLIW) microprocessor, a digital signal processor (DSP), or any other type of processor, processing circuit, execution unit, or computational machine. It should be understood that embodiments of the control system 306 should not be limited to the specific processors listed herein. The control system 306, as used herein, is intended to mean a system that uses measurements from the sensor system 304, the output of which are used to adjust a filter or convolution operator thus changing the signal used to control the marine vibrator 110. The control system 306 may run iterative learning control engine 308. Iterative learning control engine 308 may include software that runs an iterative learning control characterization (described below) to change the signal used to control the marine vibrator 110. Marine vibrators, such as marine vibrator 110, may use iterative learning control characterizations to control a phase, generate a repeatable signal, and reduce unwanted harmonics on an arbitrary signal. The iterative learning control characterization may be impacted by the sensors used as feedback to the iterative learning control characterization. In some embodiments, the output from the sensor system 304 may be used as input to iterative learning control engine 308 to change the signal used to control the marine vibrator 110. The control system 306 may first use a seismic sensor (e.g., hydrophone) in the far field as feedback to the iterative learning control engine 308 with the hydrophone signal as the reference signal. However, if only the seismic sensor in the far field is used as feedback, then it may be contaminated by disturbances in the water or another nearby source. To reduce this problem, embodiments may further use motion sensor 402 (FIG. 4). In some embodiments, signals from the motion sensor 402 may be recorded and correlated with signals from the seismic sensor (e.g., one of seismic sensors 108 shown on FIG. 1). The iterative learning control engine 308 may be run with the seismic sensor until vibrator output is stable with a reduction in harmonics and desired spectral characteristics. As the signals from the motion sensor 402 have been correlated with the signals from the seismic sensor, the motion sensor 402 may now be used as feedback to the iterative learning control engine 308 with the motion sensor 402 as the reference signal, such that the marine vibrator 110 is being controlled using the motion sensor signal (e.g., motion sensor signal 600 on FIG. 6) as the reference signal. By changing the signal input to the marine vibrator 110 by using first the seismic sensor as feedback and then switching to the motion sensor 402, the vibrator output may have an energy output having desired spectral characteristics (e.g., as close as practical to the desired spectral content). The vibrator output may also have spectral characteristics that are repeatable. In addition, harmonic frequencies in the vibrator output may also be suitably suppressed.

As previously described, the iterative learning control engine 308 may be configured to run an iterative learning control characterization. In some embodiments, the iterative learning control characterization may not be performed in real time. Processing with the control system 306 may be done when the signals from the sensor system 304 have been recorded, for example, by a seismic sensor (e.g., hydrophone) or a motion sensor 402 (e.g., accelerometer). For example, the motion sensor 402 (e.g., accelerometer) can measure the movement of the outer shell 206 of the marine vibrator 110 (e.g., shown on FIG. 2). The iterative learning control characterization may calculate the new signal for the marine vibrator 110. For example, an iterative learning control characterization can be iterated until the transmitted signal approaches a reference signal. In some embodiments, the iterative learning control characterization may be iterated until the transmitted signal is equal to the reference signal or within a predetermined tolerance, such as, for example, differing from the reference signal by about 0% to about 10%. When the seismic sensor (e.g., one of seismic sensors 108 shown on FIG. 1) may be used as feedback, its measurements may be recorded and used as the transmitted signal while also being used as the reference signal. When the motion sensor 402 may be used as feedback, its measurements may be recorded and used as the transmitted signal while also being used as the reference signal, such that the marine vibrator 110 is being controlled by the motion sensor signal (e.g., motion sensor signal 600 on FIG. 6) as the reference signal.

The iterative learning control characterization may implement the following equation in the frequency domain for calculating a new control signal:

$$U_{ny} = U + ITF \cdot (a_1 \cdot (R-Y) + a_2 \cdot (Y_L - Y)) \qquad 1$$

where $U_{ny}$ is the new control signal which can be sent to the power amplifier 302 after being transformed from the frequency domain to the time domain. U is the previous control signal. ITF is the inverse transfer function. R is the reference signal. The reference signal R may be the seismic signal or the motion signal, as described above. Y is the latest transmitted signal (from the marine vibrator 110) and $Y_L$ is the transmitted signal from the previous iteration before. For instance, at time t, a result may be Y=Y(t) and $Y_L$=Y(t−1). The transmitted signal $Y_L$ and the latest transmitted signal Y may be signals recorded by seismic sensor or the motion sensor 402 as described above, depending on which sensor is used as feedback. $a_1$ and $a_2$ are constants which can be used to determine how much the two error terms R−Y and $Y_L$−Y can influence the calculations. These constants can be adjusted to the marine vibrator 110 and can determine how quickly the new control signal $U_{ny}$ converges to the target value. For large values of $a_1$ and $a_2$, the control algorithm may not work properly and the iterative learning control characterization may become unstable. When the latest transmitted signal Y is approaching the reference signal R, the changes in the new control signal $U_{ny}$ may be almost zero, because the error R−Y and $Y_L$−Y can be virtually zero and thus the new control signal $U_{ny}$ may approach, or potentially be equal to the previous control signal U.

Before running the iterative learning control characterization, the inverse transfer function (ITF) may be calculated as it is a component of Equation (1). To obtain the ITF, a control signal may be sent to the marine vibrator 110 in the form of a sine wave with linear increasing frequency (also called chirp signal or FM Chirp) within the desired frequency band that the ITF may contain. The transmitted signal Y may then be divided by the control signal U as set forth in the following equation. In order to avoid small variations in the transmitted signal Y and noise levels, a number of chirps can be transmitted, and an average value of these can be calculated. For example:

$$U = TF \cdot Y \Rightarrow TF = \frac{U}{Y} \Rightarrow ITF = \frac{Y}{U} \qquad (2)$$

where U is control signal sent to the power amplifier 302, TF is a transfer function, ITF is the inverse transfer function, and Y is the transmitted signal. As feedback to the control system 306 and thus the iterative learning control characterization, the seismic sensor and then the motion sensor 402 may be used. The transfer function TF between the seismic sensor in the far field and the motion sensor 402 may be substantially constant and not dependent on small variations in the marine vibrator 110 that may be introduced, for example, by mechanical wear or temperature changes.

Figure 5:
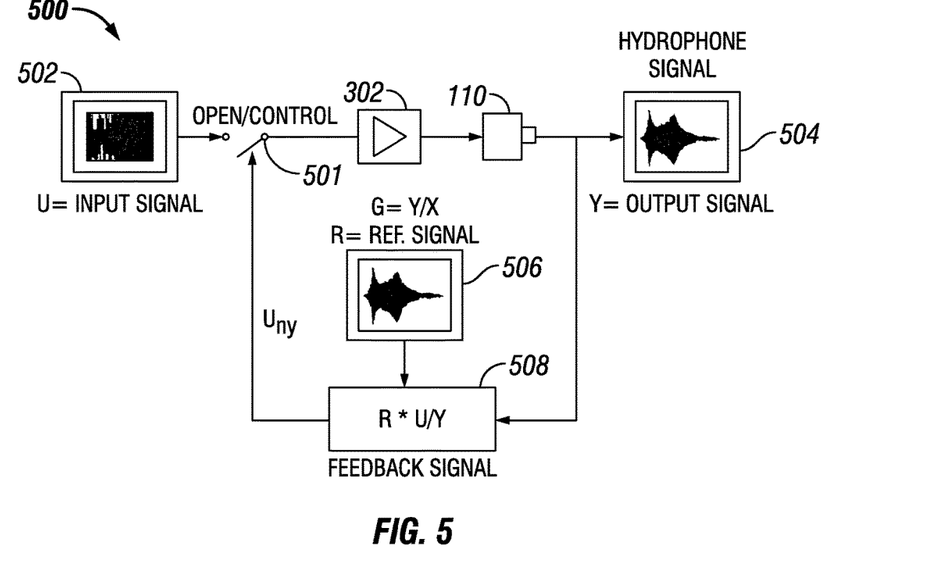
FIG. 5 illustrates an example embodiment of a control loop for operating a marine vibrator.

FIG. 5 illustrates an example embodiment of a control loop 500 that utilizes a seismic sensor (e.g., one of the seismic sensors 108 on FIG. 1), in this illustration a hydrophone, as feedback. A signal generator 502 may provide an input signal U to the marine vibrator 110. The signal generator 502 may be a component of recording system 106 (FIG. 1). When gate 501 is open, meaning that the control loop 500 is not providing feedback, the signal generator 502 may provide the input signal U to the marine vibrator 110. For example, the output of the signal generator 502 may be coupled to power amplifier 302 when gate 501 is open. In contrast, when gate 501 is closed, meaning that the control loop 500 is providing feedback, the control loop 500 will calculate a new control signal $U_{ny}$. The power amplifier 302 may receive the input signal U (e.g., in the form of an electrical impulse) from the signal generator 502, or a new control signal $U_{ny}$ from control loop 500, and transfer this signal to the marine vibrator 110, which may generate mechanical force and in turn seismic energy 114 (FIG. 1). The seismic sensor may record a measurement representative of the vibrator output. The output of the seismic sensor is shown at 504 as hydrophone signal. The hydrophone signal 504 may be used as feedback in an iterative learning control characterization. For example, the hydrophone signal 504 may be used as output signal Y in the iterative learning control characterization described above. The reference signal R may be obtained at block 506. The reference signal R may also be a hydrophone signal. At block 508, the output signal Y (e.g., the hydrophone signal 504) may be combined with reference signal R in an iterative learning control characterization to obtain a new control signal $U_{ny}$, which may then be sent to the marine vibrator 110 by way of the power amplifier 302, when gate 501 is closed.

Figure 6:
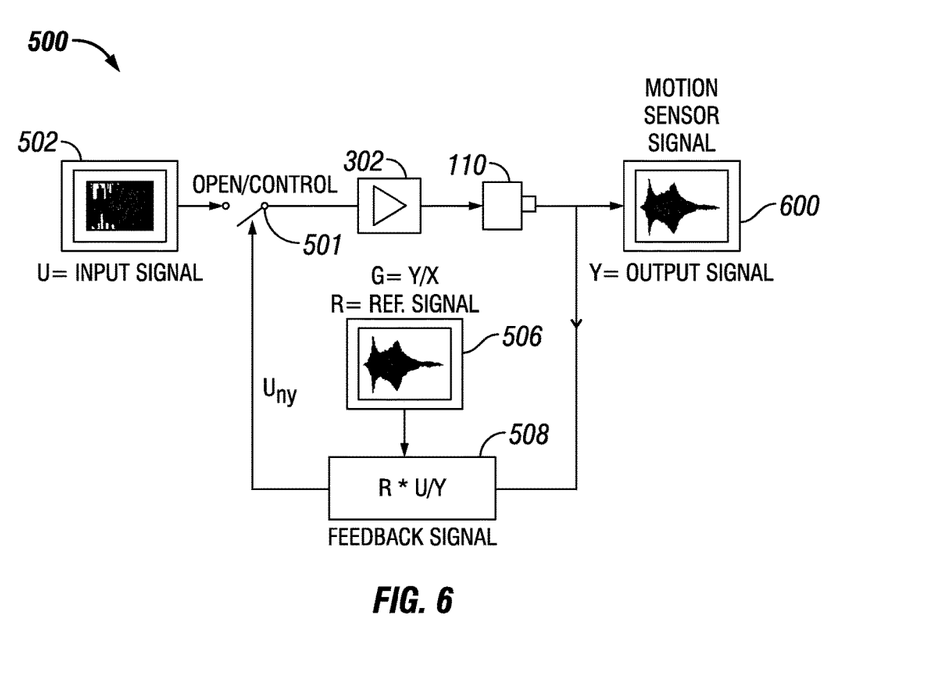
FIG. 6 illustrates another example embodiment of a control loop for operating a marine vibrator.

FIG. 6 illustrates another example embodiment of a control loop 500 that utilizes a motion sensor (e.g., motion sensor 402 on FIG. 2), in this illustration an accelerometer, as feedback. As previously described, the motion sensor 402 may be used as feedback for control of marine vibrator 110 after the seismic sensor has 306 been used. A signal generator 502 may provide an input signal U to the marine vibrator 110. The signal generator 502 may be a component of recording system 106 (FIG. 1). The output of the signal generator 502 may be coupled to power amplifier 302 when gate 501 is open. The power amplifier 302 may receive the input signal U (e.g., in the form of an electrical impulse) and transfer this signal to the marine vibrator 110, which may generate mechanical force and in turn seismic energy (e.g., seismic energy 114 on FIG. 1). The motion sensor 402 may record a measurement representative of the vibrator output. For example, the motion sensor 402 may measure movement of the outer shell 206 of the marine vibrator 110 (e.g., shown on FIG. 2). The output of the motion sensor is shown at 600 as motion sensor signal, which may be an accelerometer signal, for example. The motion sensor signal 600 may be used as feedback in an iterative learning control characterization. For example, the motion sensor signal 600 may be used as output signal Y in the iterative learning control characterization described above. The reference signal R may be obtained at block 506. The reference signal R may also be a motion sensor signal, such as an accelerometer signal, such that the motion sensor signal 600 is used as the reference signal R to control the marine vibrator 110. At block 508, the output signal Y (e.g., the motion sensor signal 600) may be combined with reference signal R in an iterative learning control characterization to obtain a new control signal $U_{ny}$, which may then be sent to the marine vibrator 110 by way of the power amplifier 302, when gate 501 is closed.

Figure 7:
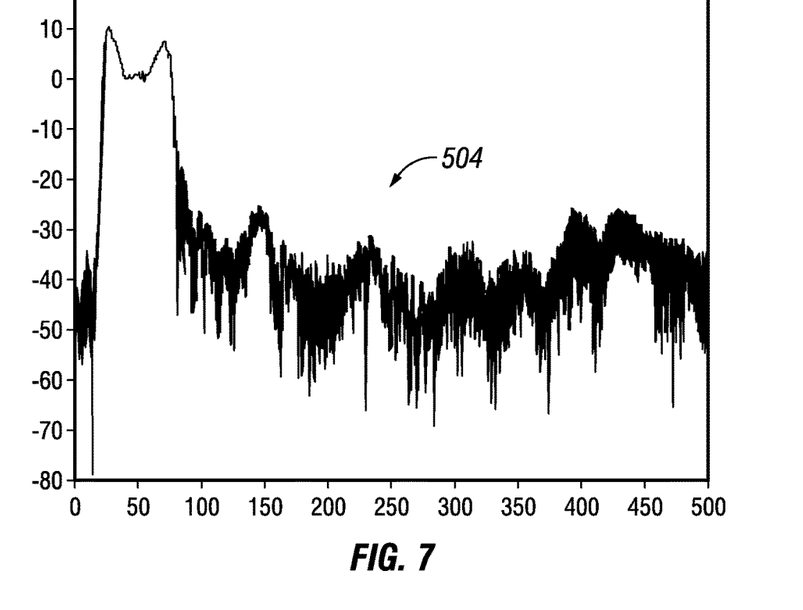
FIG. 7 illustrates a graph of a hydrophone signal without any feedback.
Figure 8:
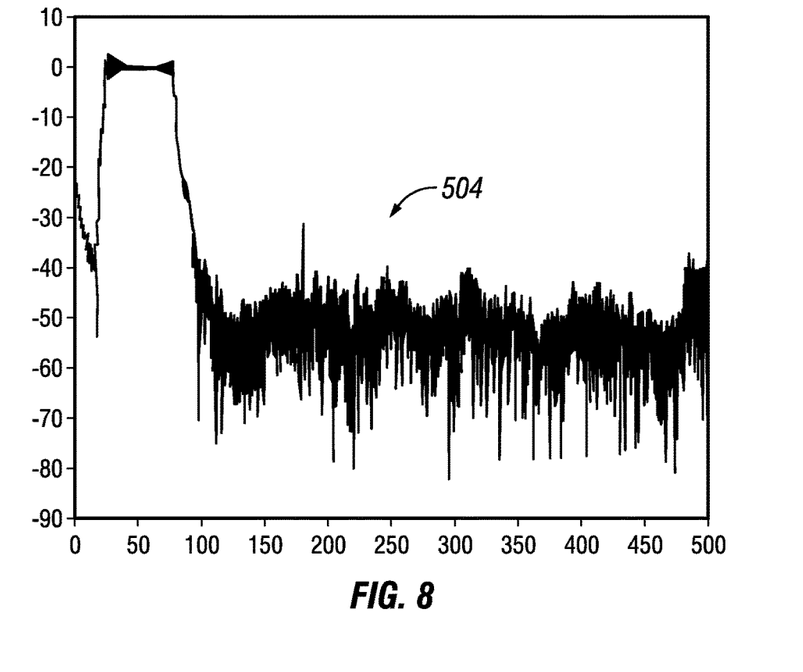
FIG. 8 illustrates a graph of a hydrophone signal with feedback.
Figure 9:
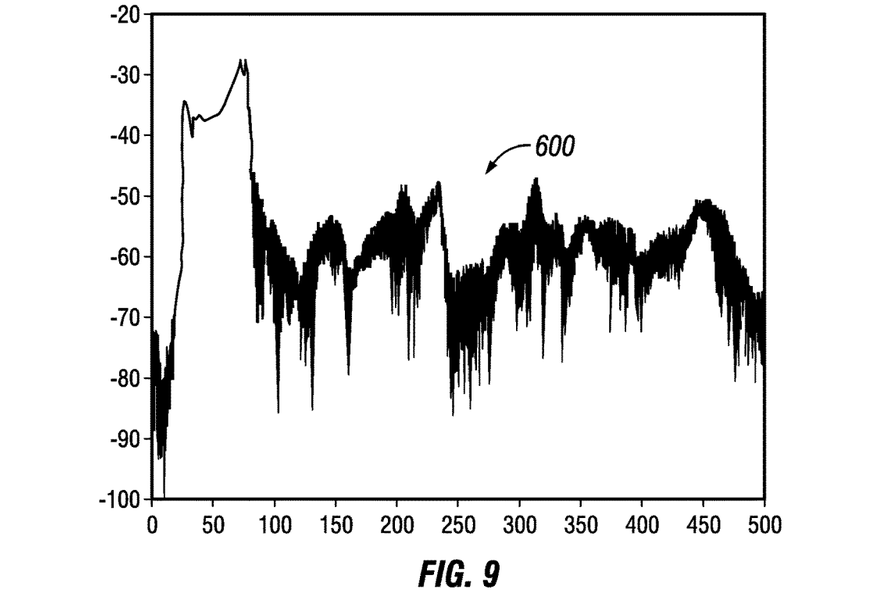
FIG. 9 illustrates a graph of a motion sensor signal without any feedback.
Figure 10:
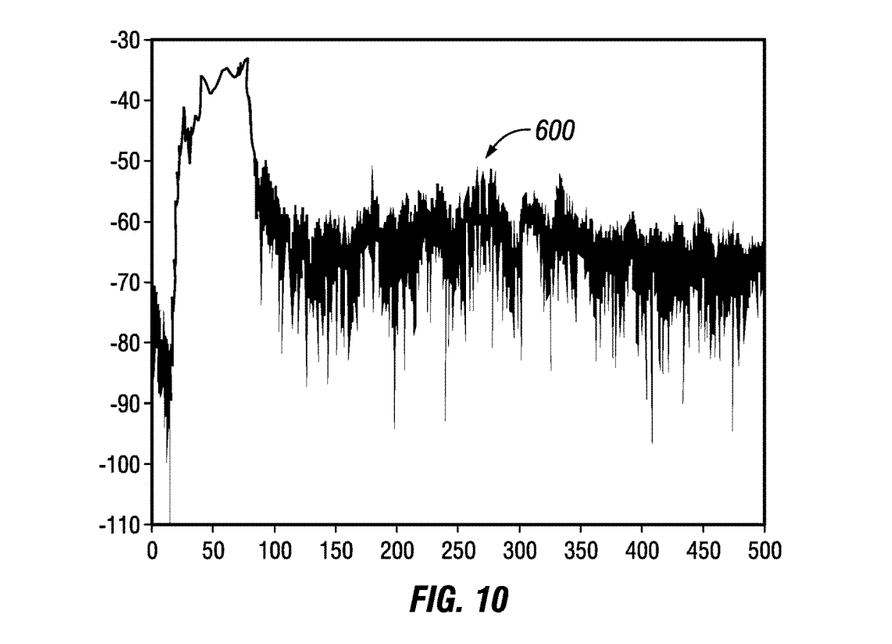
FIG. 10 illustrates a graph of a motion sensor signal when a hydrophone signal has been used to reduce harmonics.

To illustrate uses of different sensors as feedback to the iterative learning control engine 308 (FIG. 3), FIGS. 7-10 are provided that show signals recorded by sensors in sensor system 304 (FIG. 3). FIG. 7 shows a hydrophone signal 504 with control loop 500 (e.g., shown on FIG. 5) without any feedback. FIG. 8 shows a hydrophone signal 504 with control loop 500 (e.g., shown on FIG. 5) with feedback from seismic sensor (e.g., seismic sensor 108 shown on FIG. 1). FIG. 9 shows a motion sensor signal 600 (e.g., an accelerometer signal) with control loop 500 (e.g., shown on FIG. 6) without any feedback. FIG. 10 shows a motion sensor signal 600 (e.g., an accelerometer signal) when the hydrophone signal 504 has been used in the iterative learning control characterization to attenuate harmonics. This motion sensor signal 600 can then be used as the reference signal R for operating the marine vibrator 110 (e.g., shown on FIG. 1) going forward.

Figure 11:
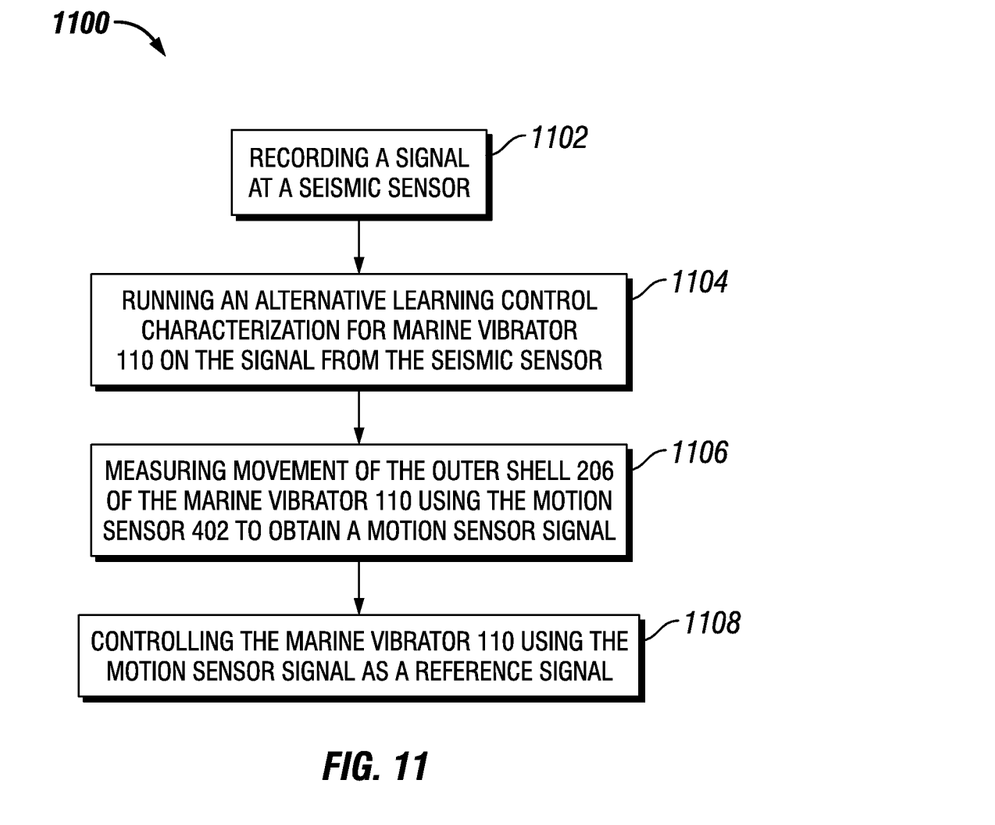
FIG. 11 illustrates a flow chart of an example method for controlling a marine vibrator.

FIG. 11 illustrates a flowchart of an example method 1100 for controlling the marine vibrator 110. The method 1100 of FIG. 11 will be described with additional reference to the marine seismic survey system 100 shown on FIG. 1. However, it should be understood that the marine seismic survey system 100 of FIG. 1 is merely illustrative and the method 1100 may be used other configurations of the marine seismic survey system 100 as will be appreciated by those of ordinary skill in the art. At block 1102, the method 1100 may comprise recording a signal at a seismic sensor. The signal may be a response signal to seismic energy generated by the marine vibrator 110, for example, the seismic energy being generated, as the marine vibrator 110 is towed by the survey vessel 102 in the body of water 104. The seismic sensor may be a far field sensor, such as a hydrophone, as previously described, which may be remote from the marine vibrator 110. In some embodiments, the seismic sensor may be one of the seismic sensors 108 on sensor streamer 112. At block 1104, the method 1100 may further comprise running an iterative learning control characterization for the marine vibrator 10 on the signal from the seismic sensor. The iterative learning control characterization may or may not be performed in real time. At block 1106, the method 1100 may further comprise measuring movement of the outer shell 206 (FIG. 2) of the marine vibrator 110 using the motion sensor 402 (FIG. 4) to obtain a motion sensor signal. In some embodiments, the motion sensor 402 may comprise an accelerometer, for example, disposed in a middle of a shell side-portion 406 of the outer shell 206 of the marine vibrator 110 as shown on FIG. 4. At block 1108, the method may further comprise controlling the marine vibrator 110 using the motion sensor signal as a reference signal. In some embodiments, controlling the marine vibrator 110 may comprise running the iterative learning control characterization using the motion sensor 402 as feedback with the motion sensor signal as the reference signal. In some embodiments, controlling the marine vibrator 110 may further comprise calculating a new control signal for the marine vibrator.

Figure 12:
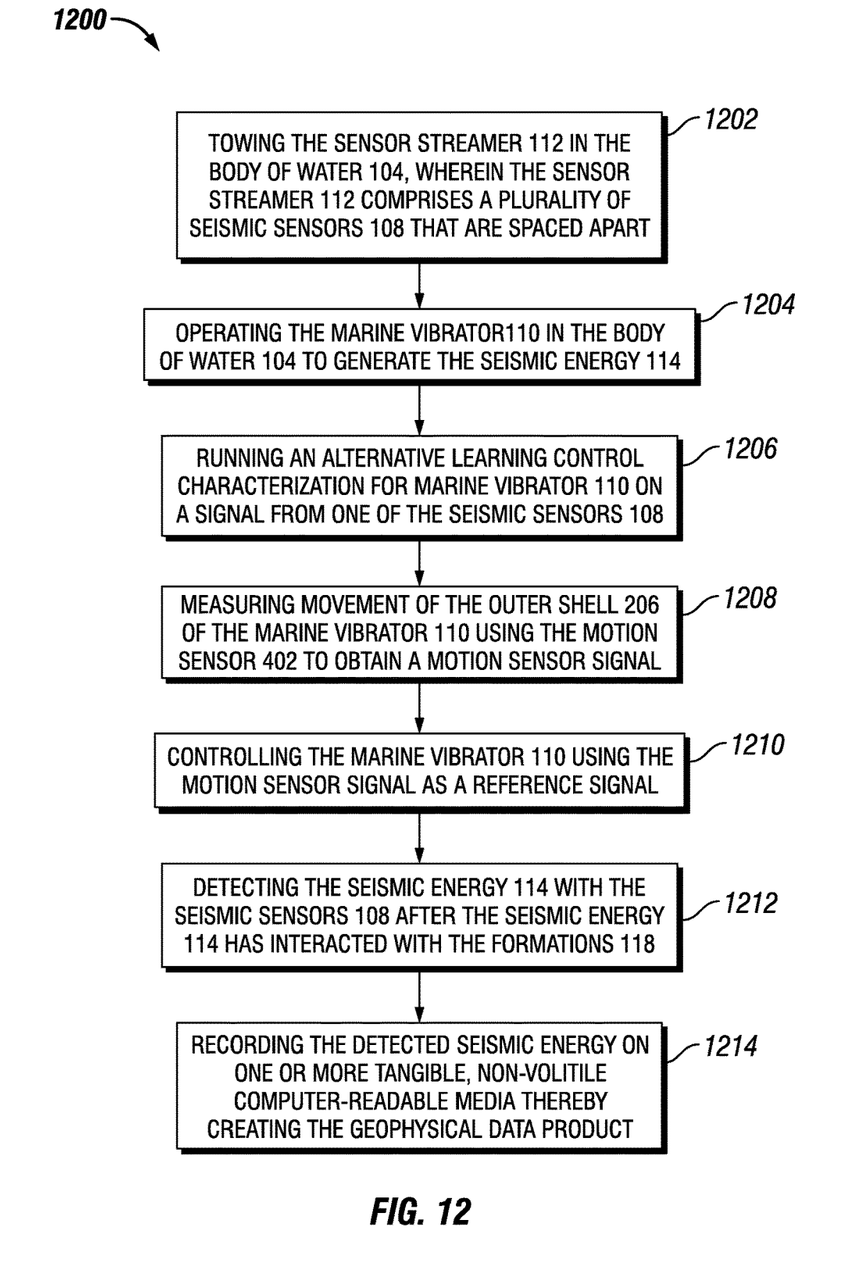
FIG. 12 illustrates a flow chart of an example method for manufacturing a geophysical data product.

FIG. 12 illustrates an example method 1200 of manufacturing a geophysical data product. The method 1200 of FIG. 12 will be described with additional reference to the marine seismic survey system 100 shown on FIG. 1. However, it should be understood that the marine seismic survey system 100 of FIG. 1 is merely illustrative and the method 1200 may be used with other configurations of the marine seismic survey system 100 as will be appreciated by those of ordinary skill in the art. At block 1202, the method may comprise towing the sensor streamer 112 in the body of water 104. The sensor streamer 112 may comprise a plurality of seismic sensors 108 that are spaced apart. At block 1204, the method may further comprise operating the marine vibrator 110 in the body of water 104 to generate the seismic energy 114. The seismic energy 114 may travel downwardly into one or more formations 118 below the water bottom 120. At block 1206, the method 1200 may comprise running an iterative learning control characterization for the marine vibrator 110 on a signal from one of the seismic sensors 108. The iterative learning control characterization may or may not be performed in real time. At block 1208, the method 1200 may further comprise measuring movement of the outer shell 206 (FIG. 2) of the marine vibrator 110 using the motion sensor 402 (FIG. 4) to obtain a motion sensor signal. In some embodiments, the motion sensor 402 may comprise an accelerometer, for example, disposed in a middle of a shell side-portion 406 of the outer shell 206 of the marine vibrator 110 as shown on FIG. 4. At block 1210, the method 1200 may further comprise controlling the marine vibrator 110 using the motion sensor signal as a reference signal. In some embodiments, controlling the marine vibrator 110 may comprise running the iterative learning control characterization using the motion sensor 402 as feedback with the motion sensor signal as the reference signal. In some embodiments, controlling the marine vibrator 110 may further comprise calculating a new control signal for the marine vibrator. At block 1212, the method 1200 may further comprise detecting the seismic energy 114 with the seismic sensors 108 after the seismic energy 114 has interacted with the formations 118. At block 1214, the method 1200 may further comprise recording the detected seismic energy on one or more tangible, non-volatile computer-readable media thereby creating the geophysical data product. In some embodiments, the geophysical data product may be imported into the United States or another country.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
recording a signal at a seismic sensor;
running an iterative learning control characterization for a marine vibrator on the signal from the seismic sensor;
measuring movement of an outer shell of the marine vibrator using a motion sensor to obtain a motion sensor signal wherein the motion sensor is disposed on a shell side-portion of the outer shell; and
controlling the marine vibrator using the motion sensor signal as a reference signal to attenuate harmonic frequencies in the marine vibrator output.

2. The method of claim 1, wherein the running the iterative learning control characterization is not performed in real time.

3. The method of claim 1, wherein the recording the signal at the seismic sensor comprises recording the signal at a hydrophone.

4. The method of claim 1, wherein the measuring the movement of the outer shell comprises measuring the movement of the outer shell of the marine vibrator using an accelerometer.

5. The method of claim 4, wherein the accelerometer is disposed in a middle of a shell side-portion of the outer shell.

6. The method of claim 1, wherein the controlling the marine vibrator using the motion sensor signal comprises running the iterative learning control characterization using the motion sensor as feedback with the motion sensor signal recorded during the measuring the movement as the reference signal.

7. The method of claim 6, wherein the controlling the marine vibrator comprises calculating a new control signal for the marine vibrator.

8. The method of claim 1, further comprising towing a sensor streamer behind a survey vessel, wherein the sensor streamer comprises the seismic sensor.

9. The method of claim 8, further comprising towing the marine vibrator behind the survey vessel.

10. A method of manufacturing a geophysical data product, the method comprising:
- towing a sensor streamer in a body of water, wherein the sensor streamer comprises a plurality of seismic sensors that are spaced apart;
- operating a marine vibrator in the body of water to generate seismic energy that travels downwardly into one or more formations below a water bottom;
- running an iterative learning control characterization for the marine vibrator on a signal from one of the seismic sensors;
- measuring movement of an outer shell of the marine vibrator using a motion sensor to obtain a motion sensor signal;
- controlling the marine vibrator using the motion sensor signal as a reference signal to reduce harmonics in the marine vibrator output;
- detecting the seismic energy with the seismic sensors after the seismic energy has interacted with the formations; and
- recording the detected seismic energy on one or more tangible, non-volatile computer-readable media thereby creating the geophysical data product.

11. The method of claim 10, further comprising importing the geophysical data product into the United States or another country.

12. The method of claim 10, further comprising recording the signal used in the iterative learning control characterization with a hydrophone on the sensor streamer, and wherein the measuring the movement of the outer shell comprises measuring the movement of the outer shell of the marine vibrator using an accelerometer.

13. The method of claim 10, wherein the controlling the marine vibrator using the motion sensor signal comprises running the iterative learning control characterization using the motion sensor as feedback with the motion sensor signal recorded during the measuring the movement as the reference signal.

14. A marine vibrator system, comprising:
- a marine vibrator comprising an outer shell;
- a power amplifier configured to transfer electrical signals to the marine vibrator;
- a sensor system comprising a seismic sensor and a motion sensor, wherein the motion sensor is directly coupled to the outer shell;
- an iterative learning control engine configured to run an iterative learning control characterization based on the seismic sensor as feedback and then run the iterative learning control characterization based on the motion sensor as the feedback, wherein the iterative learning control engine calculates a new control signal from the marine vibrator; and
- a control system configured to run the iterative learning control engine and provide the new control signal to the marine vibrator to reduce unwanted harmonics in the marine vibrator output.

15. The system of claim 14, wherein the motion sensor comprises an accelerometer.

16. The system of claim 15, wherein the accelerometer is coupled to a middle of a shell side-portion of the outer shell.

17. The system of claim 14, wherein the seismic sensor comprises a hydrophone disposed on a sensor streamer.

18. The system of claim 17, wherein the sensor streamer is coupled to a survey vessel and extends from the survey vessel.

19. The system of claim 14, wherein the marine vibrator has two resonance frequencies, when submerged in a body of water, in a frequency range between about 1 hertz and about 100 hertz.

20. The system of claim 14, wherein the control system further comprises a signal generator.

* * * * *